T. D. BURRALL.
Corn Sheller.
No. 38,002. Patented March 24, 1863.
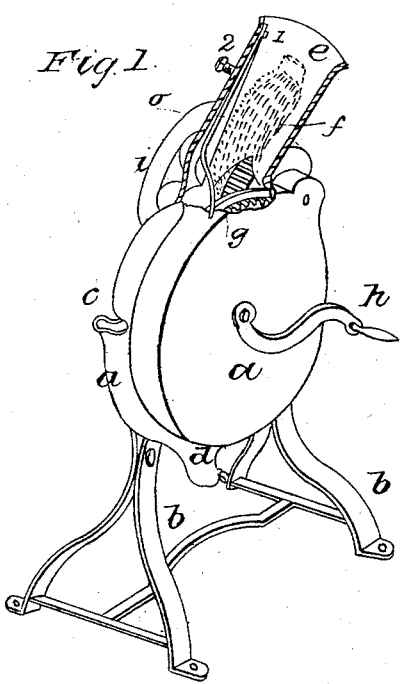
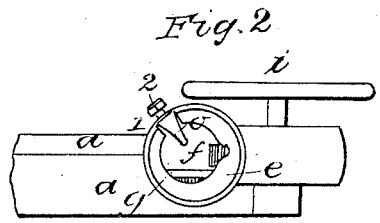
WITNESSES
John O'Riley
John Gardner
INVENTOR
Thomas D Burrall

UNITED STATES PATENT OFFICE.

THOMAS D. BURRALL, OF GENEVA, NEW YORK, ASSIGNOR TO WILLIAM D. BURRALL, OF SAME PLACE.

IMPROVEMENT IN CORN-SHELLERS.

Specification forming part of Letters Patent No. 38,002, dated March 24, 1863.

*To all whom it may concern:*

Be it known that I, THOMAS D. BURRALL, of Geneva, in the county of Ontario and State of New York, have invented, made, and applied to use a certain new and useful Improvement in Corn-Shellers; and I do hereby declare that the following is a full, clear, and exact description of my said invention, reference being had to the annexed drawings, making part of this specification, wherein—

Figure 1 is a perspective view of my corn-sheller, the hopper being shown as in section; and Fig. 2 is a plan, looking into the end of the inclined hopper.

Similar marks of reference denote the same parts.

In the corn-shellers heretofore made a spring has been applied in the hopper, attached at one end and extending nearly straight to the angle formed between the face-plate and feed-wheel, and adjusted in its pressure on the ear by a screw. With this character of spring difficulty is experienced in shelling the ears that grow crooked and irregular, because the ears have to be revolved in the hopper in order to bring all parts to the action of the feed-wheel, and said crooked and irregular ears are prevented from revolving freely by coming in contact with the said spring, and either clog up the machine or escape only partially shelled.

My present invention is an improvement on that for which Letters Patent were issued to me December 6, 1845; and it consists in the peculiar shape and mode of applying the spring that keeps the ear into the angle formed by the face-plate and feed-wheel, whereby the ear is free to revolve without obstruction, whatever size or shape it may be.

In the drawings, *a a* is the cast-iron case or shell, sustained on the legs *b b*, of any desired character. *c* is the opening in the side of the shell through which the corn-cob is discharged, as in my aforesaid patent, and *d* is the spout for discharging the shelled corn into a suitable receptacle. *e* is the hopper, *f* is the feed-wheel and *g* is the face-plate, geared together and rotated as usual by the crank *h*, and *i* is the fly-wheel. *o* is the spring attached at 1 to the upper part of the hopper, and the hopper is recessed from the point at which the spring is attached, and the spring so shaped that the shank thereof shall be contained within this said recess, so as not to present any obstruction to the rotation of the ear in the hopper, even if the ear is very crooked. The lower end of the spring is curved, as shown, so as to come sufficiently near the angle formed between the face-plate and feed-wheel to press the ear to the shelling operation. The shank of the spring, remaining in the aforesaid recess, does not present any obstruction to the rotation of an ear in the hopper, even if the same is very crooked, while the end of the spring presses the ear to the shelling operation, and the pressure with which said spring shall act against the ear is regulated by the set-screw 2. My machine is thus adapted to shelling large or small, crooked or straight ears of corn with rapidity and certainty, because the circular hopper has no obstructions to the rotation of the ear and there are no openings through which the shelled corn can be projected.

I do not claim a curved spring passing through a slot, nor a pressing-block near the end of a spring; but

What I claim, and desire to secure by Letters Patent, is—

The circular hopper *e*, provided with a recess for receiving the curved spring *o*, in the manner and for the purposes specified.

In witness whereof I have hereunto set my signature this 30th day of April, 1862.

THOMAS D. BURRALL.

Witnesses:
JOHN C. RILEY,
JOHN GARDNER.